United States Patent [19]
Pierson

[11] Patent Number: 5,796,452
[45] Date of Patent: Aug. 18, 1998

[54] SIMPLIFIED WIRING ESCAPE TECHNIQUE FOR TILED DISPLAY

[75] Inventor: Mark Vincent Pierson, Binghamton, N.Y.

[73] Assignee: International Business Machines Corporation, Armonk, N.Y.

[21] Appl. No.: 828,215

[22] Filed: Mar. 21, 1997

[51] Int. Cl.$^6$ .......... G02F 1/1345; G02F 1/1343
[52] U.S. Cl. .......... 349/73; 349/143; 349/149
[58] Field of Search .......... 349/73, 139, 143, 349/149, 152; 345/206, 205, 87; 445/24

[56] References Cited

U.S. PATENT DOCUMENTS

| 3,861,783 | 1/1975 | Dill et al. | 349/73 |
|---|---|---|---|
| 4,408,836 | 10/1983 | Kikuno | 349/73 |
| 4,629,289 | 12/1986 | Streit | 350/336 |
| 4,824,215 | 4/1989 | Joseph et al. | 350/339 |
| 4,832,457 | 5/1989 | Saitoh et al. | 349/73 |
| 4,906,071 | 3/1990 | Takahara et al. | 349/73 |
| 4,982,273 | 1/1991 | Brody | 345/205 |
| 5,076,669 | 12/1991 | Black et al. | 359/63 |
| 5,106,197 | 4/1992 | Ohuchida et al. | 349/73 |
| 5,164,853 | 11/1992 | Shimazaki | 349/73 |
| 5,563,470 | 10/1996 | Li | 445/24 |
| 5,654,781 | 8/1997 | Izumi | 349/73 |
| 5,673,091 | 9/1997 | Boisdron et al. | 349/73 |

FOREIGN PATENT DOCUMENTS

| 59-7342 | 1/1984 | Japan | G02F 1/133 |
|---|---|---|---|
| 2-32389 | 2/1990 | Japan | G09F 9/00 |

Primary Examiner—William L. Sikes
Assistant Examiner—Tai V. Duong
Attorney, Agent, or Firm—Pollock, Vande Sande & Priddy

[57] ABSTRACT

A liquid crystal display is provided having a plurality of liquid crystal displays arranged in matrix and interconnected to a tile carrier wherein at least one of the individual display tiles has both its X and Y address wiring routed to a single tile edge.

4 Claims, 2 Drawing Sheets

SIMPLIFIED WIRING ESCAPE TECHNIQUE FOR TILED DISPLAY

DESCRIPTION

1. Technical Field

The present invention is concerned with providing the electrical escape for a liquid crystal display of a plurality of liquid crystal display tiles to the edge of the tile carrier. More particularly, the present invention is concerned with a technique for providing the necessary electrical escape or wiring for liquid crystal display tiles arranged in a matrix of at least 2×3 display tiles. The present invention simplifies the tile wiring and in turn eliminates as many electrical connections as possible. This in turn results in saving precious real estate of the tile display.

2. Background Art

Liquid crystal displays (LCDs) are used extensively as monitors for numerous computer applications. Generally, liquid crystal displays are an assembly comprising a glass panel unit (which is a thin film transistor matrix controlling a liquid crystal emulsion contained between glass plate electrodes); driver electronics which provide the control signals to the thin film transistor matrix and a lighting unit placed beneath the glass panel unit for illuminating the liquid crystal display panel. The glass panel unit includes a transparent glass substrate upon which the thin film transistor matrix is placed (the LCD or panel substrate), a second conducting transparent glass plate placed a small distance from and parallel to the panel substrate, filled-in between with the liquid crystal material, and sealed around the edges. The second glass panel is also prepared as a electrode to establish a capacitive connection with the individual transistors or pixels in the thin film transistor matrix on the panel substrate. The entire assembly is housed by a frame and usually has the driver assemblies attached to the frame near the front surface of the panel substrate which contains the thin film transistor array. A liquid crystal material is subjected to electric fields set up between the transistors and the thin film transistor and the cover glass transparent electrode.

Increasing the size of LCDs is continuous being demanded by industry. One method used to fabricate larger displays is referred to as tiling. In tiling, conventional size (e.g., 3"×3" or 4"×4") LCD tiles are arranged in a matrix. Typically, the driver chips are interconnected to the LCD either directly on the parameter of the display or to flexible tape which is then interconnected to the edge of LCD. The individual LCD tiles that are arranged in a matrix are sandwiched between a cover plate and a back plate of a tile carrier.

The tile carrier serves the electrical function of carrying the row and column (X and Y) driver circuits to the individual tiles. As such, the tile carrier contains two metal layers for designs of 2×3 tiles or greater. This requires the use of a transparent dielectric or preferably a photo imagable dielectric such as IBM's ASM, an epoxy based polymer system, that can be developed out of the pixel windows. The circuits must be routed such that they do not interfere with the transmission of light through the pixels in the LCDs. Therefore, the wiring must be fit into the dark spaces between individual pixels of a LCD.

A black matrix material may also be used in this layer to make the screen look more uniform and help hide the tile-to-tile seams. A preferred material for such purposes is PSR 4000 which can act as a solder mask and is opaque at reasonable thicknesses of about 1 to about 3 mils. PSR is an epoxy-based ink available from Taiyo Ink Manufacturing Co. The cover plate can also contain a black matrix layer to define the pixels and camouflage the seams between adjacent tiles.

In the tiling method, edges of an individual LCD tile may be internal to the overall matrix edge. However, these internal edges must also be electrically connected to the driver chips. Currently, these interconnections are made by wire bonding, flex circuits or conductive adhesives. However, these methods pose serious limitations to the minimal spacing that can be achieved between individual tile elements in the matrix. The spacing between tiles represents a critical parameter that must be controlled in order to present a "seamless" look generated by the tiled LCD.

One of the first ways to escape the horizontal wiring within a 2×3 tile matrix and greater is to run it to a tiny conductor ledge on the tile, connect a conductor to that ledge, connect that conductor to a metallized surface on the bottom glass of the tile, and escape it outward to the edge of the bottom glass. For instance, usually external LCD tile 1 pixel wiring escapes 2 are carried out in a vertical and horizontal configuration as illustrated in FIG. 1 in order to address each pixel and each pixel color. The tiles 1 are adhesively attached (see FIG. 3, numeral 15) to the bottom glass 3 of the tile carrier, and a top glass (not shown), and aligned carefully to each other for optical consistency.

As the tile assembly increases from a 2×2 configuration to a 2×3 configuration (see FIG. 2), the horizontal wiring 4 of the two inner tiles poses a significant problem for a number of reasons. One reason is that the geometry between pixels 8 (see FIG. 3) is very small, something on the order of about 0.012" which includes two seals 5, a conductive ledge 6, and a space between tiles 7 (see FIG. 3). Another reason is that escaping a conductor from the conductive ledge 6 down the edge of the glass 9 and attaching to a horizontally run circuit path 10 on the bottom glass 14 with either surface metallurgy and solder or wire bond (see U.S. Pat. application Ser. No. 08/834,861 (Docket No. EN996-056), filed Apr. 10, 1997, and U.S. Pat. application Ser. No. 08/865,713 (Docket No. EN996-058), filed May 30, 1997, respectively, disclosures of which are incorporated herein by reference, significantly increases the complexity and costs involved. In turn, a dramatic decrease in reliability can result.

Accordingly, improved techniques for escaping the wiring within a tile matrix that simplify the interconnections would be desirable.

SUMMARY OF INVENTION

The present invention provides a technique for escaping the horizontal wiring within a tile matrix of at least 2×3 tiles that results in significantly reducing the complexity of outer tile wiring and eliminates to the extent possible the number of necessary electrical connections.

In particular, the present invention is concerned with a tiled liquid crystal flat panel display comprising a plurality of liquid crystal display tiles arranged in a matrix of at least 2×3 tiles, and interconnected to a tile carrier. At least one of the individual display tiles has both its X and Y address wiring routed to a single tile edge for providing the interconnection to the tile carrier.

Still other objects and advantages of the present invention will become readily apparent to those skilled in this art from the following detailed description, wherein it shown and described only the preferred embodiments of the invention, simply by way os illustration of the best mode contemplated of carrying out the invention. As will be realized, the invention is capable of other and different embodiments, and its several details are capable of modifications in various obvious respects, without departing from the invention. Accordingly, the drawings and description are to be regarded as illustrative in nature and not as restrictive.

BEST AND VARIOUS MODES FOR CARRYING OUT INVENTION

Figure 1:
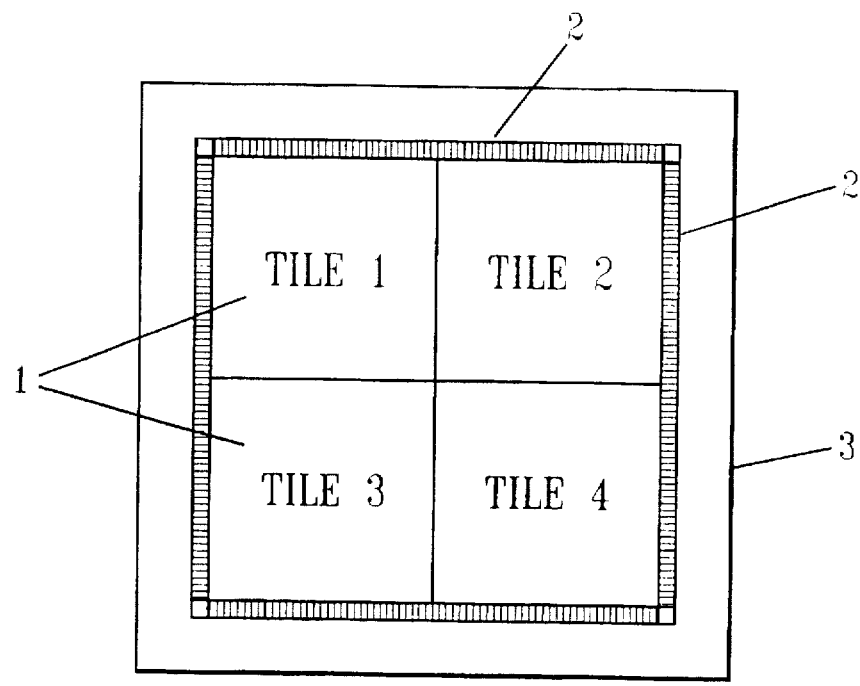
FIG. 1 is a schematic diagram of a top view of LCD matrix of 4 tiles along with its wiring according to prior art technique.
Figure 2:
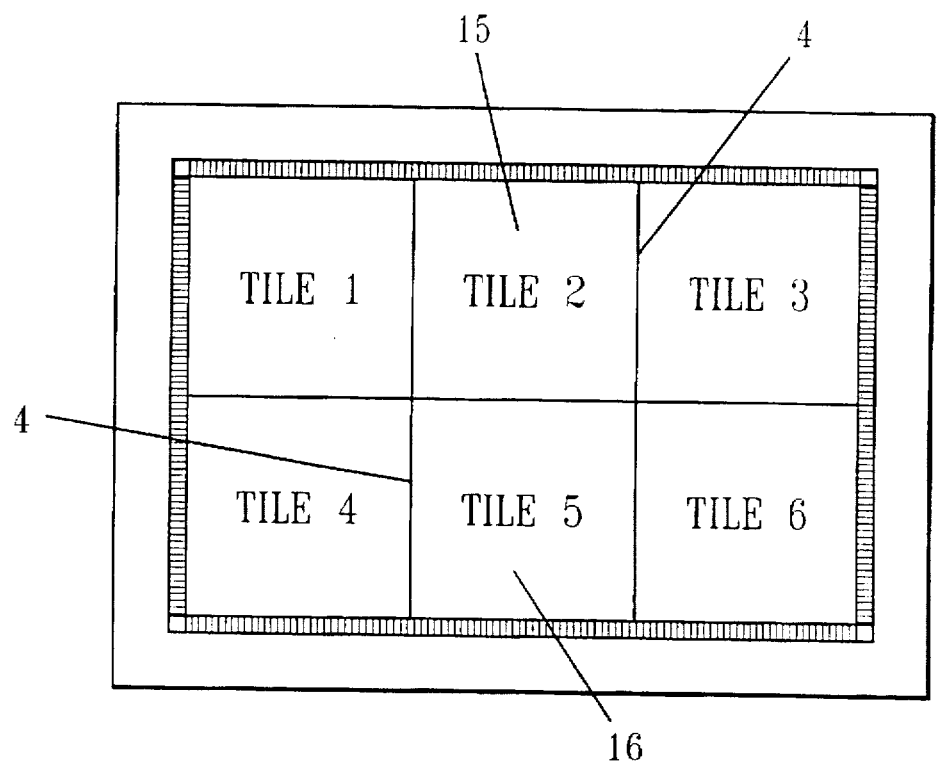
FIG. 2 is a schematic diagram of a top view of a 2×3 tile matrix.
Figure 3:
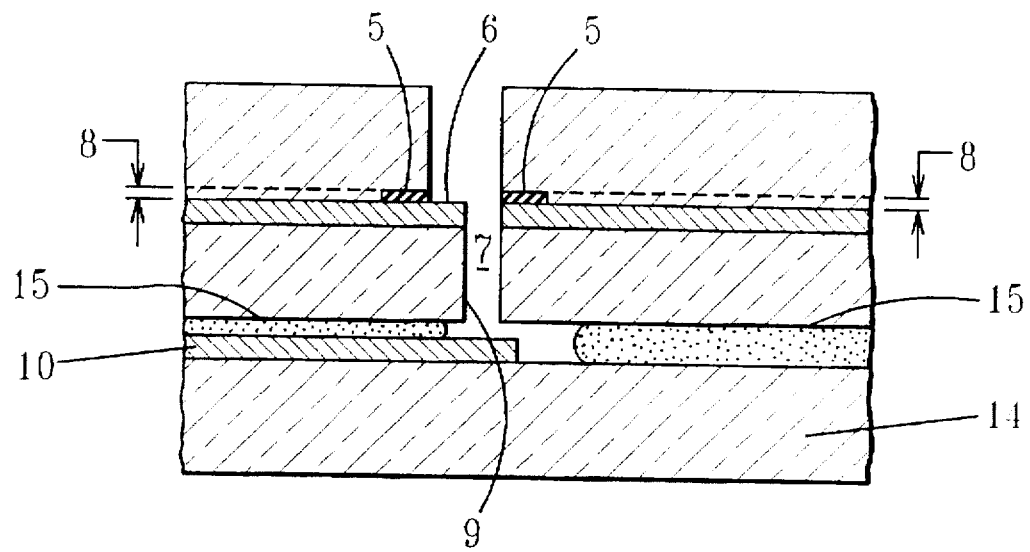
FIG. 3 is a schematic cross section of interconnection of an alternative less efficient technique.
Figure 4:
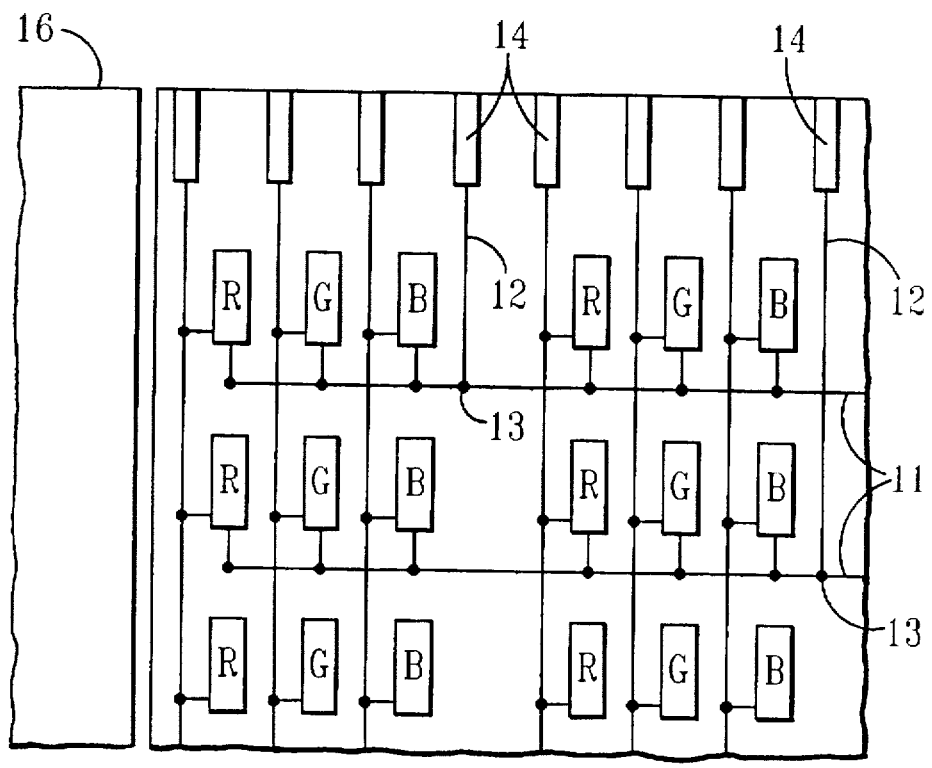
FIG. 4 is a schematic of a top view of tile wiring according to the present invention.

In order to facilitate an understanding of the present invention, reference will be made to the figures. As discussed, the wiring technique, according to the present invention, is especially applicable for arrangements of 2×3 tile matrices and higher, such as 2×4 matrices and so on. The interconnection, according to the present invention, is achieved by interconnecting at least one of the individual display tiles, e.g., an internal tile such as tiles 2 and/or 5 in FIG. 2, by having both the X and Y address wiring routed to a single tile edge. In FIG. 4, instead of running the horizontal row connector 11 just horizontally, vertical lines 12 are attached to each horizonal run 11 at interconnect point 13. The interconnection to the outside of the inner tiles 2 and 5 are then in turn made via connector pads 14. Connector pads 14 are typically of an electrically conductive solderable material such as gold or copper. As shown, each pixel has all of its escape pads for both the X and Y directions provided for. It is noted that the pixel matrix contains more addressable sites in the X direction then in the Y direction. This in turn requires that the arranged pads mold pixels in the X direction as compared to the Y direction.

The liquid crystal displays comprise a glass panel unit, which is a thin film transistor matrix controlling a liquid crystal emulsion contained between two glass plate electrodes, and a lighting unit placed behind the glass panel unit for illuminating the liquid crystal display panel. The glass panel unit includes a transparent glass substrate upon which the thin film transistor matrix is placed, a second conducting transistor glass plate placed a small distance from and parallel to the panel substrate, filled-in between with the liquid crystal panel, and sealed around the edges. The second glass panel is also prepared as an electrode to establish a compacitive connection with the individual transistors or pixels in the thin film transistor matrix on the panel substrate.

Each liquid crystal display is then sandwiched between a cover plate and a back plate constituting the tile carrier. The liquid crystal display tiles are arranged in a juxtaposed arrangement forming a planer or flat panel display.

The back plate of the tile carrier serves the electrical function of carrying the row and column driver circuits to the individual tiles. As such, it requires two middle layers for designs of 2×3 tiles or greater. This requires the use of a transparent dielectric, or preferably a photo imagable dielectric such as IBM's ASM that can be developed our of the pixel windows. The routing of the circuits as illustrated in FIG. 4 is such that they do no interfere with the transmission of light through the pixels in the LCDs. Therefore, the wiring fits into the dark spaces between pixels as shown in FIG. 4. A black matrix material may also be used on this layer to make the screen look more uniform and help camouflage or hide the tile-to-tile seams. A preferred material for this purpose is PSR 4000 from Taiyo Ink Manufacturing Co., which can act as a solder mask and is opaque at reasonable thicknesses of about 1 to about 3 mils.

In addition, the cover plate of the tile carrier can contain a black matrix layer for defining the pixels and hiding the seams.

In this disclosure, there are shown and described only the preferred embodiments of the invention, but as aforementioned, it is to be understood that the invention is capable of use in various other combinations and environments, and is capable of changes or modifications within the scope of the inventive concept as expressed herein.

What is claimed is:

1. A liquid crystal flat panel display comprising a plurality of liquid crystal display tile arranged in a matrix of at least 2×3 tiles and electrically interconnected to a tile carrier wherein at least one of the individual display tiles has both the X and Y address wiring routed to a single tile edge for providing said electrical interconnection to said tile carrier.

2. The liquid crystal flat panel display of claim 1 wherein both of the inner tiles of a 2×3 tile matrix have both the X and Y address wiring routed to a single tile edge of each tile for providing the electrical interconnection to said tile carrier.

3. The liquid crystal flat panel display of claim 1 wherein the inner tiles contain a pixel matrix having more addressable sites in the X direction than in the Y direction.

4. The liquid crystal flat panel display of claim 1 wherein said matrix is at least a 2×4 tile matrix.

* * * * *